(12) United States Patent
Bredholt et al.

(10) Patent No.: US 9,818,014 B2
(45) Date of Patent: Nov. 14, 2017

(54) SURFACE SENSOR

(71) Applicant: IDEX ASA, Fornebu (NO)

(72) Inventors: Geir Ivar Bredholt, Oslo (NO); Ralph W. Bernstein, Hosle (NO); Øyvind Sløgedal, Hosle (NO)

(73) Assignee: IDEX ASA, Fornebu (NO)

( * ) Notice: Subject to any disclaimer, the term of this patent is extended or adjusted under 35 U.S.C. 154(b) by 18 days.

(21) Appl. No.: 14/904,527

(22) PCT Filed: Jun. 23, 2014

(86) PCT No.: PCT/EP2014/063139
§ 371 (c)(1),
(2) Date: Jan. 12, 2016

(87) PCT Pub. No.: WO2015/003891
PCT Pub. Date: Jan. 15, 2015

(65) Prior Publication Data
US 2016/0148035 A1 May 26, 2016

(30) Foreign Application Priority Data

Jul. 12, 2013 (NO) .................................. 20130970

(51) Int. Cl.
*G06K 9/00* (2006.01)
(52) U.S. Cl.
CPC ....... *G06K 9/0002* (2013.01); *G06K 9/00053* (2013.01)
(58) Field of Classification Search
CPC .. G06K 9/00899; G06K 9/002; G06K 9/0002; G06K 9/00053; G06F 3/0416;
(Continued)

(56) References Cited

U.S. PATENT DOCUMENTS 8,195,282 B2 * 6/2012 Hashimshony ...... A61B 5/0075
324/600
9,471,825 B2 * 10/2016 Lowe ................. G06K 19/0718
(Continued)

FOREIGN PATENT DOCUMENTS

NO  WO 2011080262 A1 *  7/2011  ........... G09K 9/0002
WO  WO 2004066194 A1     8/2004
(Continued)

OTHER PUBLICATIONS

International Search Report issued in International Patent Application No. PCT/EP2014/063139, 4 pages dated (Sep. 16, 2014).
(Continued)

*Primary Examiner* — Ali Bayat
(74) *Attorney, Agent, or Firm* — Rothwell, Figg, Ernst & Manbeck, P.C.

(57) ABSTRACT

A sensor unit for measuring surface structures and properties of an object of organic tissue includes a contact surface adapted to have mechanical contact with the object, a first dielectric layer made from a dielectric material, a first conductor layer including at least one shielding electrode essentially covering an area of the dielectric layer facing the contact surface, the at least one shielding electrode surrounding at least one essentially non-conductive aperture defining a sensing region, and a second conductor layer separated from the first conductor layer by the first dielectric layer and comprising a number of conductive wires extending at least partially under the at least one aperture and having a direction essentially perpendicular to the sensing region, each wire having a predetermined width. A sensing area of each wire is defined by the width and the length of each wire extending in the sensing region.

17 Claims, 4 Drawing Sheets

(58) Field of Classification Search
CPC ......... G06F 3/044; A61B 5/053; A61B 5/442; A61B 5/6826; H01L 21/4857; H01L 27/14634
See application file for complete search history.

(56) References Cited

U.S. PATENT DOCUMENTS

2013/0127772 A1    5/2013    Guard et al.
2013/0194071 A1*   8/2013    Slogedal .............. G06K 9/0002
                                                  340/5.82

FOREIGN PATENT DOCUMENTS

WO    WO 2010023323 A1    3/2010
WO    WO 2011080262 A1    7/2011

OTHER PUBLICATIONS

Written Opinion issued in International Patent Application No. PCT/EP2014/063139, 7 pages dated (Jan. 12, 2016).
Search Report issued in Norwegian Patent Application No. 20130370, 2 pages dated (Feb. 11, 2014).

* cited by examiner

SURFACE SENSOR

CROSS-REFERENCE TO RELATED APPLICATION(S)

This application is a 35 U.S.C. §371 National Phase Entry Application from PCT/EP2014/063139, filed Jun. 23, 2014, designating the United States, which claims priority to Norwegian Application No. 20130970 filed Jul. 12, 2013. The disclosures of these applications are incorporated by reference herein in their entirety.

FIELD OF THE DISCLOSURE

The present invention relates to a sensor for detection of structures and properties of organic tissue or its surface, especially a fingerprint sensor, comprising a chosen number of sensor electrodes at chosen positions for electrical and mechanical coupling to a finger surface and its tissue, having a size comparable to the size of the structures, characteristics, or properties of the finger tissue or surface.

BACKGROUND

In the recent years, biometrics, and especially fingerprint sensors, have become common for the purpose of verifying the identity of a person, e.g., at immigration control and at airports, as well as with personal devices, such as laptops, mobile phones, tabs, pads, etc. The present solutions still have a number of disadvantages. Fingerprint sensors used in airports and immigration control are large and too expensive for many applications, and smaller sensors seen in portable devices are often silicon based solutions with limited robustness, design flexibility, and challenging electronic interconnections. Traditional silicon production techniques for such sensors often result in solutions for electrical interconnection features interfering with the physical finger interface of the device. Recessed mounting of the sensor in a consumer application is often implemented to improve these shortcomings, but may not be the optimal solution both with respect to esthetical design and protection from dirt and moisture. Sensor size, both volume and area, along with the rigid properties of silicon, significantly limits the feasibility of integrating fingerprint devices in thin and flexible applications such as smartcards.

A fingerprint sensor which may be flush mounted in the same plane as the surface of the product it is mounted into is described in U.S. Pat. No. 7,251,351, in which a set of first electrodes/sensor elements is positioned on one side of an insulating substrate provided with through-substrate-via conductors. The substrate may be made of glass, ceramics or other insulating materials. In international patent application WO2011/080262, a similar solution is discussed based on a flexible material for low cost production. A known fingerprint sensor is also described in US2009/0252385 and U.S. Pat. No. 7,099,496 where the characteristics of the finger surface are measured by the effect of the field between a number of wire ends and an electrode extending at a distance from the wire ends. The electrodes may be position over or under a dielectric material. This solution has a limited resolution as it depends on the radial, fringing field extending from the wire ends to the perpendicular drive electrode and also requires a high accuracy in positioning of the electrodes. Another example of the known art is presented in U.S. Pat. No. 8,224,044 where the circuitry is positioned on the opposite side of the substrate from the finger surface. This provides for simple manufacturing but at the cost of resolution.

SUMMARY

Thus it is an object of the present invention to offer a low cost fingerprint sensor realized by well established, high volume, low cost manufacturing processes with high resolution. This is accomplished with a fingerprint sensor as stated above being characterized as described in the independent claims.

In this way a sensor is obtained where the resolution of the sensor depends on the wire width and the length the wire extends into an aperture defined in a conductive layer above it, on the opposite side of a dielectric layer. In a preferred embodiment the wires extend across the width of the aperture, the sensing area of each wire thus being a direct function of the wire width and the aperture width. During production of the sensor unit, the exact positioning of the aperture and the wires is not critical as the measurements depend on the width of the wires and the apertures, thus the requirements in production tolerance may be reduced, hence reducing production cost. As the positioning of the aperture on one side of the dielectric and wires on the other side of the dielectric may be made with relatively large tolerance, a sensor unit can be made at low cost, without reducing the resolution of the sensor.

In the following descriptions, the term "detection of voltage or current" will be understood by a person skilled in the art as a method for detection and collection of information about the related capacitance, impedance, electromagnetic field, fingerprint or other biometric, physical, physiological, thermal or optical or characteristics or properties of the tissue or its surface positioned over the electrodes of the sensor. Also, the term coupling is, unless specifically mentioned, to be understood as including both direct electrical galvanic contact between two parts as well as capacitive or inductive coupling of two parts separated physically by a dielectric material.

BRIEF DESCRIPTION OF THE DRAWINGS

The sensor unit according to the invention will be described below with reference to the accompanying drawings, illustrating the invention by way of examples.

DETAILED DESCRIPTION

Figure 1:
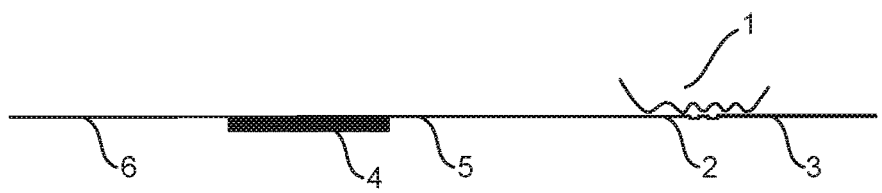
FIG. 1 illustrates an exemplary embodiment of the invention implemented on a thin foil.

As is illustrated in FIG. 1 an exemplary embodiment is constituted by a thin foil 5 having a sensing region 2 adapted to provide electrical coupling to the finger 1 positioned over the sensor. The sensing region 2 preferably has a length that is comparable to the width of the finger. The measurements are in an exemplary embodiment performed in a per se known way by applying a varying voltage between a drive electrode 3 and the sensing areas through the finger 1. Both the sensing areas and the drive electrode are coupled to an ASIC 4 adapted to provide means for measuring the impedance of the fingerprint based on the detected voltage or current and thus in a time sequence providing a two dimensional representation of the pattern of the fingerprint 1. The foil may also be provided with interface contacts 6, e.g., at one end of the foil using standard connector means.

Figure 2A:
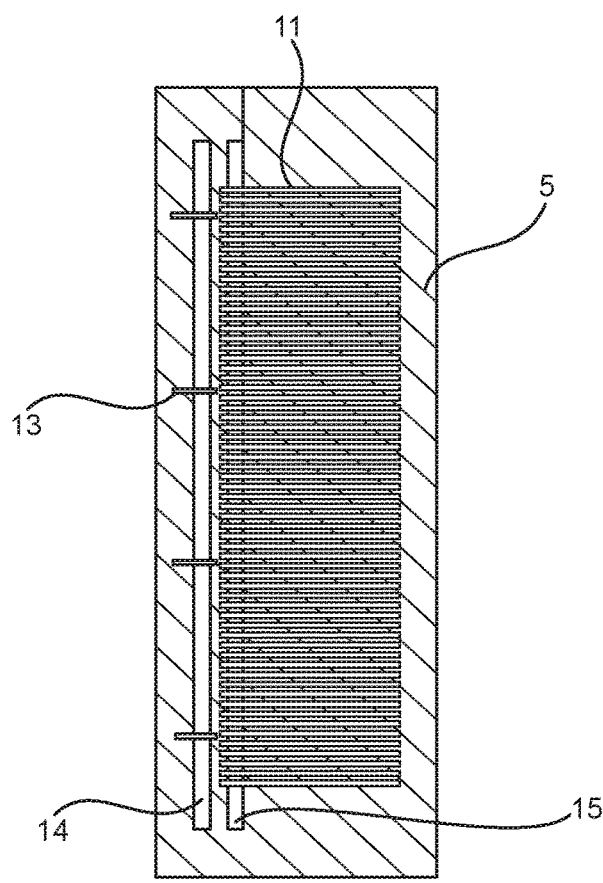
FIGS. 2a, 2b illustrate one exemplary embodiment of the invention comprising two sensing lines in two apertures.
Figure 2B:
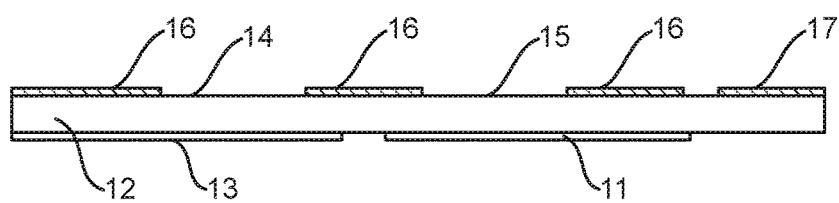

FIGS. 2a and 2b illustrate the details of the sensing region of an exemplary embodiment of the sensor unit, where FIG. 2a exemplifies the layout of the shield and wire electrodes while FIG. 2b exemplifies the cross section of the sensor unit along the direction of the conducting wires. A first number of sensor wires 11 coupled to the processing unit of ASIC 4 are positioned on one side of a dielectric layer 12. On the other side of the dielectric layer a shield electrode 16 is positioned defining an elongated aperture 14 over the sensor wires 11. The shield electrode is covered by a first dielectric layer (not shown), constituting a contact surface for the finger, that provides an insulating layer between the shield electrode and the finger surface. In addition the sensor unit is provided with at least one drive electrode 17 coupled to the processing unit 4 as stated above. Thus the resulting electrical field extends between the drive electrode 17 through the finger and the aperture to the sensor wires 11. In this way the size of each sensor area is related to each sensor wire defined by the width and the length of the part of the wire 11 present within the aperture 14.

This solves the problem of aligning the first and second conductor layers on the different sides of the first dielectric layer as the exact position of the aperture is not critical as long as the width and orientation is well defined.

As is shown in FIGS. 2a and 2b, the exemplary sensor unit comprises two sets of sensing wires 11, 13, each set in a separate aperture, all of them coupled to the processing unit 4. The sensor unit thus comprises two parallel sensor regions 14, 15, which in a swipe sensor may be used to measure the movement of the finger over the sensor as is known from U.S. Pat. No. 7,110,577. In another exemplary embodiment, the number of sensing wires and apertures might be increased to provide a two-dimensional sensor matrix, thus comprising a number of apertures over a number of sensing wires and for example using multiplexing techniques for obtaining readout.

The dielectric foil material 12 in the apertures 14, 15 may have a reduced thickness compared with the area outside the aperture or may be completely removed, or another material having chosen characteristics may be filled in depending on required characteristics of the sensor unit, such as the impedance.

The exemplary embodiment in FIGS. 2a and 2b may be produced on a dielectric foil, e.g., made from polyimide, where the two apertures each have a width of 130 µm and are separated by 150 µm of foil material. Each wire has a width of 20-50 µm. If the sensor is made on a single side of a thicker carrier substrate, the distance between the sensing wires and aperture may be substantially lower, in the 0.1-10 µm range.

Figure 3A:
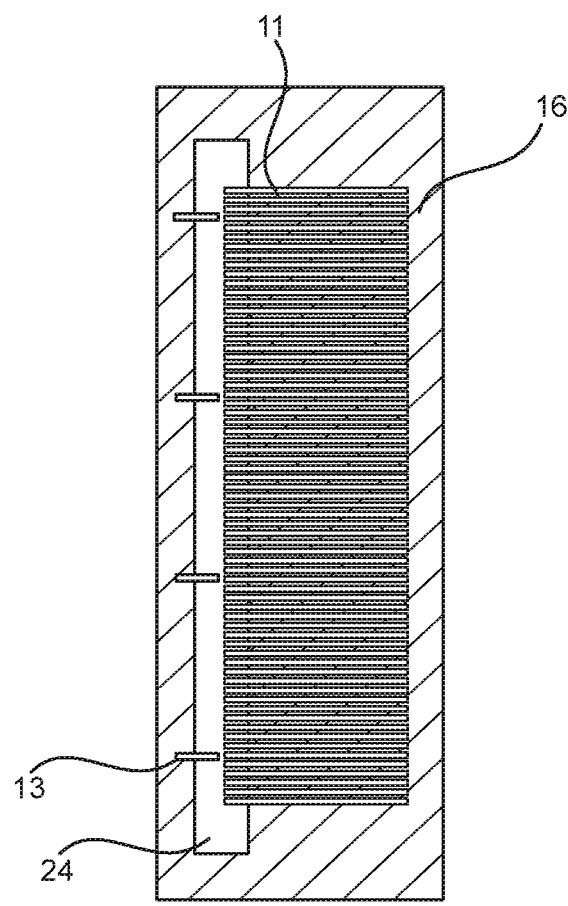
FIGS. 3a, 3b illustrate one exemplary embodiment of the invention comprising two sensing lines in one aperture.
Figure 3B:
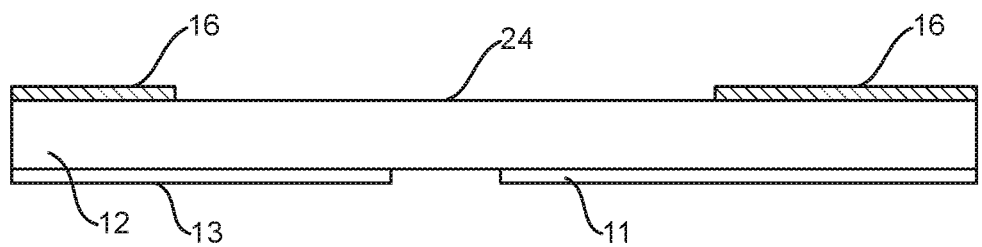

FIGS. 3a and 3b illustrate a simplified exemplary embodiment where a single aperture 24 is provided and the sensing wires extend a predetermined length into the aperture and the sensing area for each wire is defined by the length of the wire into the aperture and the width of each wire. Depending on the alignment between the wire layer and the aperture layer, the lengths of the wires within the aperture may vary in the range of +/−25 µm.

The present invention mainly relates to a sensor unit for measuring structures and properties of the surface of an object of organic tissue, especially related to a fingerprint sensor, wherein the object in one exemplary embodiment is swiped over the sensor unit with a chosen direction. In other exemplary embodiments, the object might be stationary or rubbed over the sensor. The sensor unit has a contact surface adapted to have mechanical contact with the object. This contact surface will preferably be a dielectric layer protecting the rest of the unit, but may also include areas providing galvanic coupling between the object and, for example, a drive electrode (not shown).

The unit is constituted by a first dielectric layer made from a dielectric material having a chosen thickness. A first conductor layer is provided on one side of the dielectric layer facing the contact surface, where the first conductor layer includes at least one shielding electrode essentially covering an area of the dielectric layer facing the contact surface. The shielding electrode defines a non-conductive aperture having predetermined dimensions, essentially surrounding the aperture. In one exemplary embodiment the aperture is essentially linear and the direction of the linear aperture essentially perpendicular to a predetermined swipe direction. The opening in the shield electrode in the first conductor layer may be filled with a dielectric material, e.g., in the process of providing a dielectric contact surface.

The sensor unit also comprises a second conductor layer separated from the first conductor layer by the first dielectric layer that comprises a number of conductive wires extending at least partially under the at least one aperture. The wires preferably extend in an essentially linear direction in the area beneath the aperture, the direction being essentially perpendicular to the linear sensing region defined by the aperture, each wire having a predetermined width. The wires may extend across or partially into the area defined by the aperture depending on the application as discussed above, where in the first case the related sensing areas is defined by the aperture width and the wire width, while in the latter case by the extension length and the wire width.

In this way the sensing area is related to each wire defined by the width of the wire in the sensing area and the length of each wire extending in the sensing region.

Each wire is coupled to a processing unit, the processing unit also being coupled to at least one drive electrode positioned so as to be coupled to the object surface and to apply a varying voltage between the drive electrode and the wires in the sensing region. For insulation purposes a second dielectric layer may be provided below the wires, either being made from a rigid material or a flexible material depending on the intended use. To increase resolution when there is a limited number of channels in the processing circuit, every second sensor element could be connected to ground or a fixed potential.

The wires may be coupled to the processor through several different embodiments. According to one embodiment, the wires extend as conductors along the dielectric layer in the lateral direction, in a similar way as in WO2011/080262, thus making a flexible sensor unit where the conductors are lead through a flexible substrate and possibly extending in the lateral direction. Corresponding solutions involving rigid substrates are discussed in U.S. Pat. No. 7,251,351, U.S. Pat. No. 7,848,550 and WO2010/023323 where the conductors extend through substrates to the processor positioned on the other side. The processor may also be positioned at a distance from the sensing region on the same side of the conductors as the sensing region, as disclosed in WO2003/049012. The processor may also be electrically coupled to an interface means for communicating with external equipment.

As is shown in the drawings the sensor unit may comprise two apertures, each representing a sensing region and each comprising wires defining sensing areas in the sensing region. Alternatively, two sensing regions are obtained using only one aperture where the wires extend partially into the aperture from opposite sides. The extension length and wire width will then define each sensing area. In both cases two sets of sensors are obtained which may provide a means for measuring the validity of the object over the sensor. In another exemplary embodiment, the number of sensing wires and apertures might be increased to provide a two-dimensional sensor matrix.

The processing unit in one exemplary embodiment is adapted to measure the characteristics in the individual sensor areas in a time sequence and calculating the movement of a surface moved over the sensor unit based on the measured differences in measuring time in the individual measuring areas. In another exemplary embodiment the processing unit is adapted to measure the individual sensor areas by using multiplexing techniques.

In the aperture(s) the first dielectric layer may have a reduced thickness compared to the surrounding areas in order to adjust the impedance of the unit. In case the dielectric material is completely removed in an aperture the wires are preferably supported by a substrate layer.

The drive electrode is constituted by a part of the first conductor layer, being electrically insulated from the shielding electrode and being electrically coupled to the surface either through an intermediate dielectric layer or in a direct galvanic contact with the object. The drive electrode being coupled to the processor through or outside the dielectric layer.

In order to provide a flexible sensor the first dielectric layer may be made from a flexible material such as polyimide. Alternatively, to provide a rigid sensor it may be made from $SiO_2$ or preferably FR_4.

The invention also relates to the function of one sensor element being comprised by an aperture and a wire having a perpendicular orientation relative to the aperture. More specifically a sensor element is provided for measuring surface impedance of an object. The sensor element is coupled to a measuring unit coupled to impedance measuring means for applying a varying voltage to the object between a drive electrode and the sensor element. The sensor element comprises a first conductor layer having a dielectric opening, a dielectric layer separating the first conductor layer from a second conductor layer, the second conductor layer comprising a linear conductor extending at least partially adjacent the opening, the linear conductor being coupled to the impedance measuring means.

Figure 4:
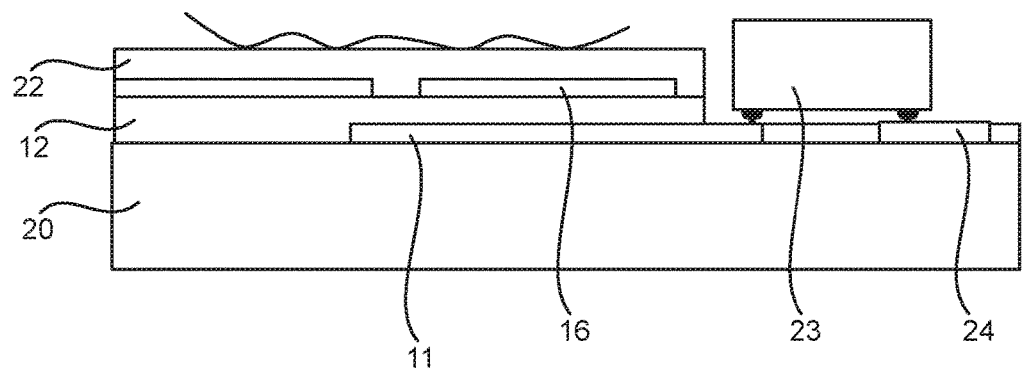
FIG. 4 illustrates a cross-section of one exemplary embodiment of the invention comprising the sensing layer and the aperture formed on the same side of the substrate. The processing circuit is mounted on the same side as the sensing and aperture layers

According to an alternative embodiment described in FIG. 4 the sensing layer 11 and the aperture layer 16 (for simplicity only one opening is drawn in the aperture layer and the coupling of this layer to the processing unit is not shown) is placed on the same side of a substrate 20. There is one dielectric layer 12 for isolating the two conducting layers and in addition there may be a protective dielectric layer 22 for mechanical protection of and electric isolation of the aperture layer. The protective dielectric layer 22 may include a diamond like coating (DLC) or similar. When possible a similar protective dielectric layer may be also used on the opposite side of the substrate, e.g., like in the embodiment shown in FIG. 4, or in FIGS. 5 and 6 being provided with openings for the contact pads 26.

The processing circuit 23 is coupled on the same side of the substrate 20 coupled to the sensing conductors 11. This solution is natural for one-sided processing techniques without substrate via possibility. The solution could also be preferred due the further integration of the sensor.

An example of I/O contacts 24 is shown placed on the same side as the sensing electrodes. For processes with substrate via possibility, the I/O contacts may also be placed on the backside.

Figure 5:
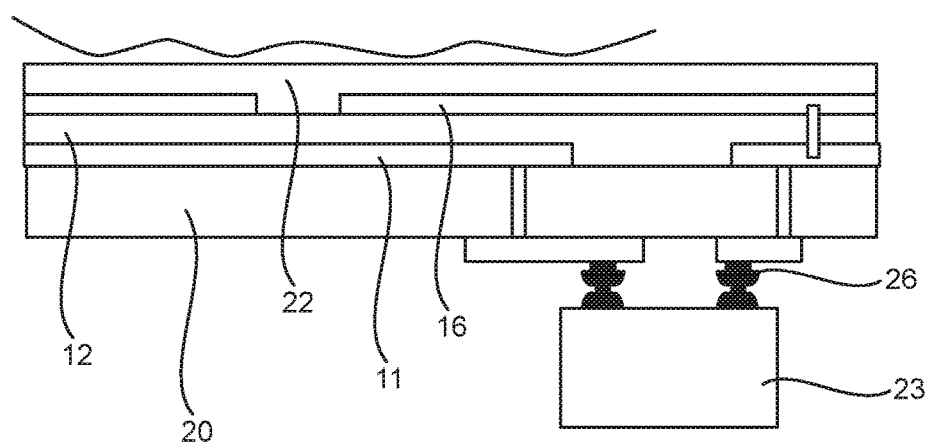
FIG. 5 illustrates a cross-section of one exemplary embodiment of the invention comprising the sensing layer and the formed on the same side of the substrate. The processing circuit is mounted on the opposite side as the sensing and aperture layers

The alternative embodiment of the invention described in FIG. 5 shows the sensing layer 11 and aperture layer 16 placed on one side of the substrate 20 and the processing unit 23 placed on the opposite side. This could be realized in a process where there is via possibilities in the base substrate, e.g., as discussed in U.S. Pat. No. 7,251,351, WO2010/023323 or WO2011/080262, depending on the required substrate characteristics. There could be more conducting redistribution layers implemented on one or both sides of the substrates to utilize further functionality or if additional layers are needed to implement the required routing.

Figure 6:
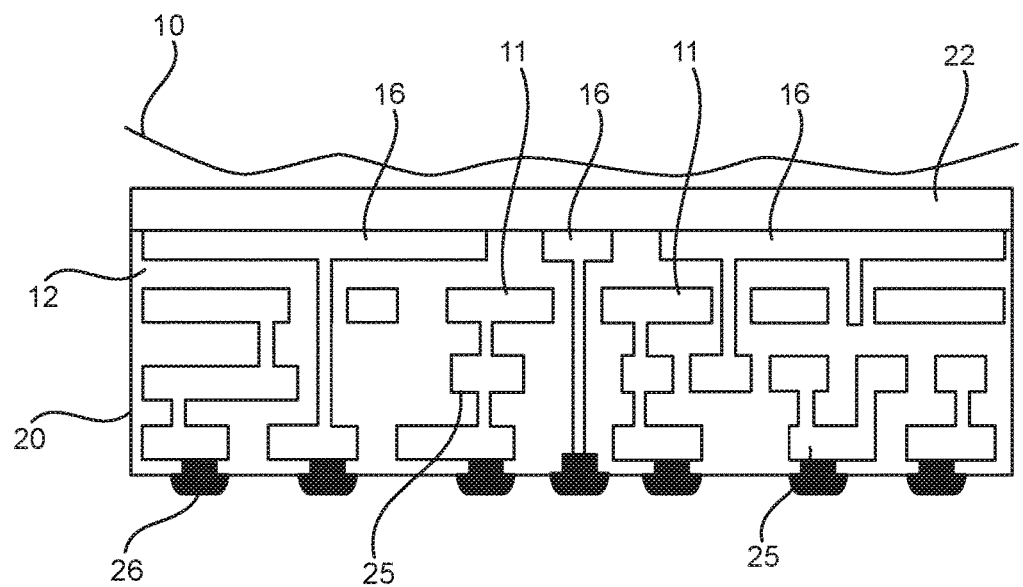
FIG. 6 illustrates a cross-section of one exemplary embodiment of the invention comprising the sensing layer and the aperture formed in a laminated layer process

In the alternative embodiment of the invention shown in FIG. 6 there is shown a realization in a multilayer process. The Substrate is realized in a build up of several layers including conductive layers 25 for routing the conductors and via conductors through the insulation layers toward coupling pads 26 for coupling to the processor. The sensing layer 11 and aperture layer 16 are placed in the layer nearest the finger 10, possibly separated from the finger by a protective layer 22. One or more additional layers is added in order to make routing possible into the processing circuit (not drawn), to add functionality or to make further integration possible.

Figure 7:
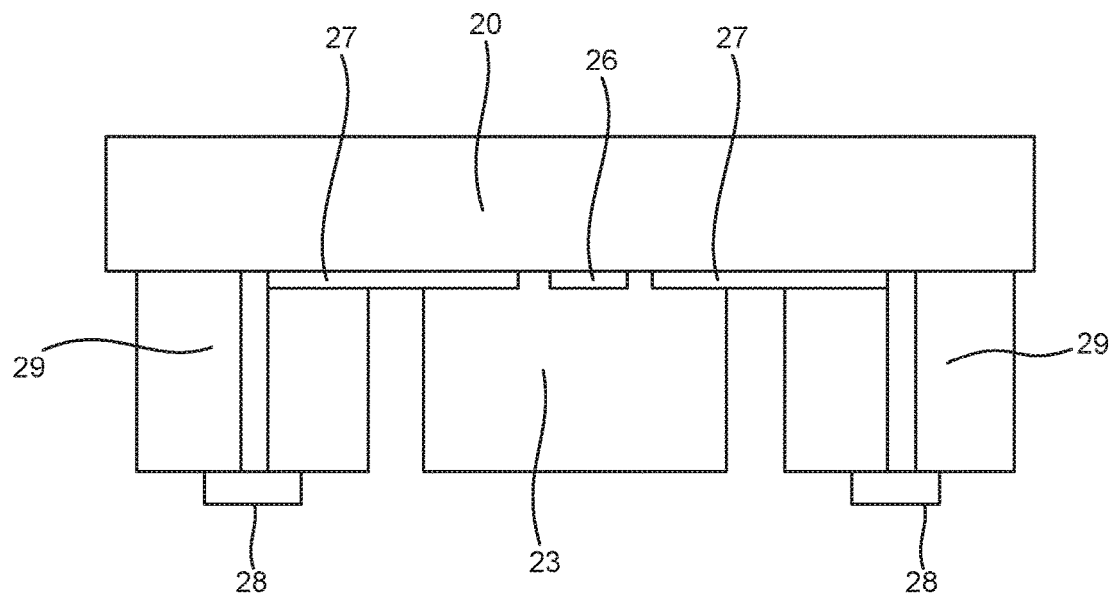
FIG. 7 illustrates a cross-section of one exemplary embodiment of the invention comprising the sensing layer and the aperture formed in one part of the substrate. A second substrate is mounted to the other side in order to make a rigid enclosure around the processing circuit

An alternative embodiment showing packaging concepts of the invention is shown in FIG. 7. A construction 29 on the backside of the substrate 20 surrounds processing circuits 23 coupled to the sensor pads 26 and is also provided with the possibility to couple IO signals from conductors 27 by the sensor substrate 20 on the backside of the construction. The purpose is to have a flat backside to ease handling and mounting to coupling means 28. There are several known methods to manufacture such a package. One method is to make the frame in PCB technology (FR-4 or other material). Then the PCB frame may be assembled to the sensing substrate in single, strips or panel format to the sensor substrate. If I/O connections should be supported between the sensor substrate and frame, the connections can be made with soldering, ACF (Anisotropic Conductive Film) or other connection technologies. The advantage of such an implementation is use of common SMT assembly methods available worldwide at EMS (Electronics Manufacturing Services) facilities. A second method to manufacture a package with such a form factor are Wafer-Level-FanOut (WLFO) packages where the ASIC wafer dies are spread in a wafer form and the frame is made of plastic molded material. The sensing layers are processed on top of the plastic. This method is a high-volume advanced packaging method supplied by OSAT (Outsource d Semiconductor Assembly and Test) companies. The process is highly automated and has low cost capabilities. A third possible method to manufacture a package with such a form factor is to use techniques for embedding the silicon chips (processing circuits) into PCB processes. This technique is mainly delivered by advanced PCB manufacturing sites and is based on lamination processes which emphasize low material cost and large panels sizes, thereby enabling low cost.

The invention claimed is:

1. Sensor unit for measuring structures and properties of an object of organic tissue, the sensor unit comprising:
   a contact surface adapted to have mechanical contact with said object,
   a first dielectric layer made from a dielectric material,
   a first conductor layer including at least one shielding electrode essentially covering an area of said first dielectric layer facing said contact surface, the at least one shielding electrode surrounding at least one essentially non-conductive aperture defining a sensing region, and
   a second conductor layer separated from said first conductor layer by said first dielectric layer and comprising a number of conductive wires extending at least partially under said at least one aperture and having a direction essentially perpendicular to said sensing region, each wire having a predetermined width,
   wherein a sensing area related to each wire is defined by the width and the length of a part of the wire extending into the sensing region.

2. Sensor unit according to claim 1, wherein each wire is coupled to a processing unit, said processing unit also being coupled to at least one drive electrode positioned so as to be galvanically or capacitively coupled to said contact surface and to apply a varying voltage between the at least one drive electrode and said wires in said sensing region.

3. Sensor unit according to claim 2, wherein said at least one drive electrode is constituted by a part of said first conductor layer, being electrically insulated from said at least one shielding electrode and being electrically coupled to said contact surface.

4. Sensor unit according to claim 2, wherein said processing unit is electrically coupled to an interface means for communicating with external equipment.

5. Sensor unit according to claim 1, wherein the at least one aperture defines an essentially linear sensing region.

6. Sensor unit according to claim 5, comprising wires extending less than half an aperture width into the aperture, the unit comprising wires extending from both sides of the aperture in direction across the aperture width, thus defining two linear sensing units in said aperture.

7. Sensor unit according to claim 1, wherein the wires extend across the width of said sensing region.

8. Sensor unit according to claim 1, comprising at least two apertures, each aperture representing a sensing region and each comprising wires defining sensing areas in said sensing region.

9. Sensor unit according to claim 8 including a processing unit, wherein said processing unit is adapted to measure characteristics in individual sensing areas in a time sequence and calculating movement of a surface moved over the sensor unit.

10. Sensor unit according to claim 1, wherein said wires extend a chosen length into said aperture, the chosen length and wire width thus defining the sensing area.

11. Sensor unit according to claim 1, wherein the first dielectric layer under said at least one aperture at least partially contains a dielectric material having a reduced thickness.

12. Sensor unit according to claim 1, wherein the first dielectric layer is completely removed under said at least one aperture.

13. Sensor unit according to claim 1, wherein said first dielectric layer is made from a flexible material.

14. Sensor unit according to claim 13, wherein said first dielectric layer is made from polyimide.

15. Sensor unit according to claim 1, wherein said first dielectric layer is made from a rigid material such as FR_4.

16. Sensor unit according to claim 1, wherein said contact surface comprises an insulating layer covering said first conductor layer.

17. Sensor unit according to claim 1, comprising a second dielectric layer separated from the first dielectric layer by said second conductor layer.

* * * * *